United States Patent
Sip

(10) Patent No.: US 8,489,899 B2
(45) Date of Patent: Jul. 16, 2013

(54) SYSTEM AND METHOD FOR ENCRYPTING AND DECRYPTING DATA

(75) Inventor: Kim-Yeung Sip, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 999 days.

(21) Appl. No.: 12/534,794

(22) Filed: Aug. 3, 2009

(65) Prior Publication Data

US 2010/0169670 A1    Jul. 1, 2010

(30) Foreign Application Priority Data

Dec. 30, 2008    (CN) .......................... 2008 1 0306672

(51) Int. Cl.
*G06F 12/14*    (2006.01)
*G06F 21/24*    (2006.01)

(52) U.S. Cl.
USPC ............................... 713/193; 380/44; 726/19

(58) Field of Classification Search
USPC .................................. 713/193; 380/44; 726/19
See application file for complete search history.

(56) References Cited

U.S. PATENT DOCUMENTS

| | | | |
|---|---|---|---|
| 7,978,849 B2 * | 7/2011 | Hinaga | 380/45 |
| 2005/0060485 A1 * | 3/2005 | Buer | 711/103 |
| 2009/0006866 A1 * | 1/2009 | Chang | 713/193 |

* cited by examiner

*Primary Examiner* — Kambiz Zand
*Assistant Examiner* — Aubrey Wyszynski
(74) *Attorney, Agent, or Firm* — Altis Law Group, Inc.

(57) ABSTRACT

A system for encrypting and decrypting data being transmitted between a data processing device and a storage device is provided. The system includes a password storing unit, an input unit, an authentication unit, a read unit, a key generator, an encrypting unit, and a decrypting unit. The password storing unit stores an initial password. The input unit is for receiving a current password. The authentication unit is for determining if the current password matches with the initial password. The read unit is for reading the initial password and an identification number of the system. The key generator is for generating an encrypting key and a decrypting key using the initial password and the identification number. If the current password matches with the initial password, the encrypting unit and the decrypting unit are operable to encrypt and decrypt the data using the encrypting key and the decrypting key correspondingly.

12 Claims, 3 Drawing Sheets

SYSTEM AND METHOD FOR ENCRYPTING AND DECRYPTING DATA

BACKGROUND

1. Technical Field

The present disclosure relates to a system and a method for encrypting and decrypting data.

2. Description of Related Art

Storage devices such as hard drives, flash memory drives and so on have been widely used for storing data such as audio, video, photo, etc. In order to prevent unauthorized use or reproduction of the data, the data can be encrypted using an encrypting key before the data are stored in the storage device. To read the encrypted data, decryption must be performed on the encrypted data with a decrypting key corresponding to the encrypting key. Conventionally, an identification number of the storage device is used to generate the encrypting key and the decrypting key. Therefore, when the storage device is stolen, the encrypted data stored in the storage device can be read by other electronic devices.

Therefore, it is desirable to provide a system and a method for encrypting and decrypting data which can overcome the above-mentioned problems.

DETAILED DESCRIPTION

Embodiments of the present disclosure will now be described in detail with reference to the drawings.

Figure 1:
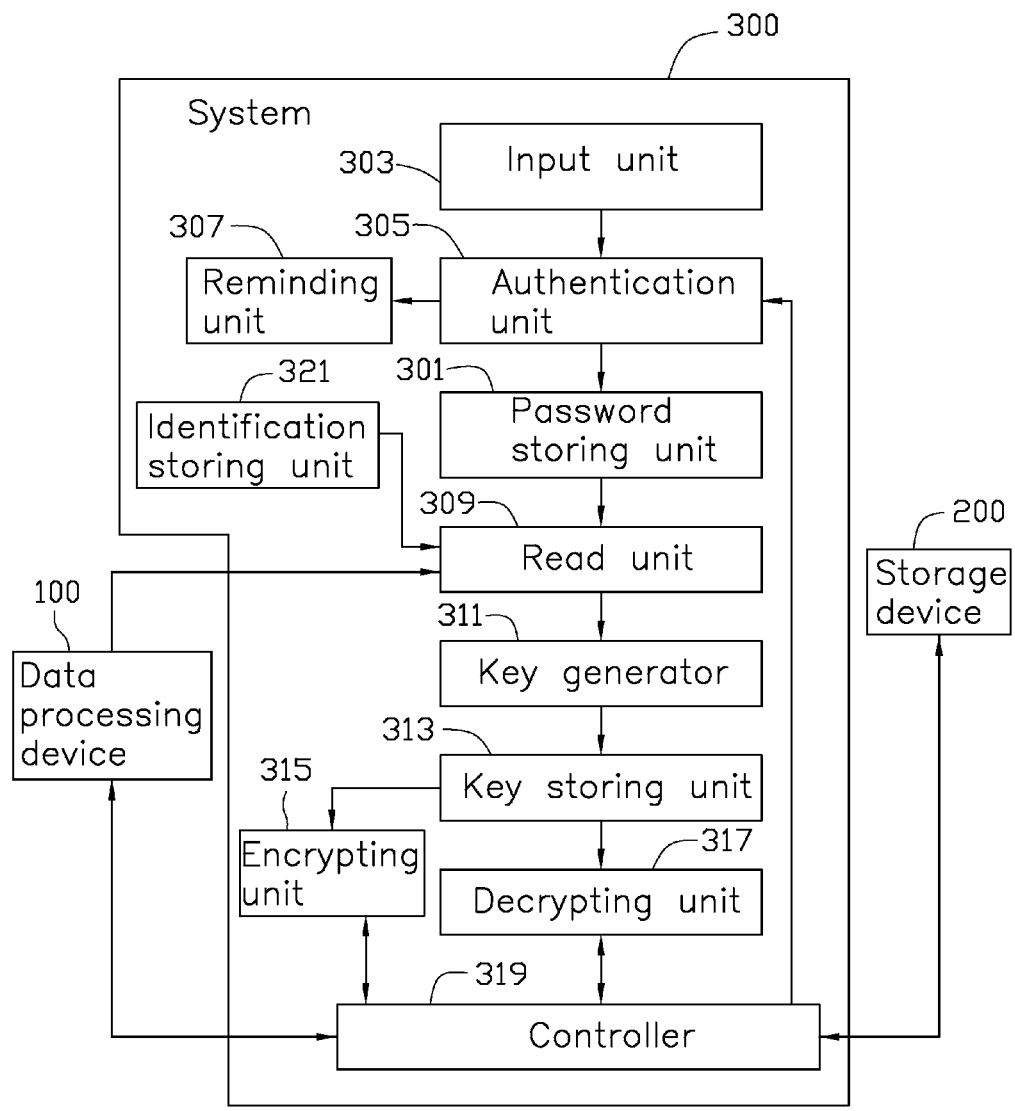
FIG. 1 is a block diagram of a system for encrypting and decrypting data, according to an exemplary embodiment.

FIG. 1 shows a system 300 for encrypting and decrypting data transmitted between a data processing device 100 and a storage device 200.

The data processing device 100 is operable to write data to the storage device 200 and read data from the storage device 200. In this embodiment, the data processing device 100 is a computer, and includes a main board, a central processing unit (CPU), and a basic input/output system (BIOS) (not shown). The data processing device 100 stores a unique identification number, which can be a manufacturer serial number of the main board or the CPU.

The storage device 200 is operable to store data transmitted from the data processing device 100. The storage device 200 can be a hard drive, a flash memory and so on.

The system 300 is interconnected between the data processing device 100 and the storage device 200. The system 300 is operable to encrypt data being transmitted from the data processing device 100 to the storage device 200, and decrypt data being transmitted from the storage device 200 to the data processing device 100. The system 300 can be a microprocessor added to the data processing device 100 or the storage device 200, or software modules which can be loaded into and executed by the CPU to perform corresponding functions The system 300 includes a password storing unit 301, an input unit 303, an authentication unit 305, a reminding unit 307, a read unit 309, a key generator 311, a key storing unit 313, an encrypting unit 315, a decrypting unit 317, a controller 319, and an identification storing unit 321.

The password storing unit 301 is operable to store an initial password. The initial password can be inputted from the input unit 303 when the system 300 is initialized. The initial password can be different from a power-on password of the data processing device 100. In this embodiment, the password storing unit 301 is a one time programmable read-only memory (OTPROM).

The input unit 303 is operable to receive a current password in response to operations of a user.

The authentication unit 305 is operable to compare the current password with the initial password to determine if the current password matches with the initial password. If the current password matches with the initial password, the authentication unit 305 outputs a valid signal to the controller 319. Otherwise, the authentication unit 305 outputs an invalid signal to the reminding unit 307.

The reminding unit 307 is operable to display that the current password is invalid when receiving the invalid signal. In this embodiment, the reminding unit 307 outputs an error message on a display (not shown).

The identification storing unit 321 is operable to store a unique identification number of the system 300. The identification number can be a manufacturer serial number of the system 300, which was determined in the identification storing unit 321 in manufacturing. In this embodiment, the identification storing unit 321 is also an OTPROM.

The read unit 309 is operable to read the identification numbers of the data processing device 100 and the system 300. The read unit 309 is also operable to read the initial password.

The key generator 311 is operable to generate an encrypting key and a corresponding decrypting key using the initial password and the identification number of the system 300.

The key storing unit 313 is operable to store the encrypting key and the decrypting key generated by the key generator 311.

The controller 319 is operable to determine if a read/write command is received from the data processing device 100 after receiving the valid signal from the authentication unit 305. If a write command is received, the controller 319 activates the encrypting unit 315. If a read command is received, the controller 319 activates the decrypting unit 317.

The encrypting unit 315 is operable to encrypt the data being transmitted from the data processing device 100 to the storage device 200 using the encrypting key.

The decrypting unit 317 is operable to decrypt the encrypted data being transmitted from the storage device 200 to the data processing device 100 using the decrypting key. In practice, the decrypting unit 317 initially detects that if the data being transmitted from the storage device 200 have been encrypted. If yes, then the decrypting unit 317 decrypts the data using the decrypting key. Otherwise, the data can directly flow through.

As described above, the identification number of the system 300 and the initial password are used to generate the decrypting key for decrypting the encrypted data stored in the storage device 200. Accordingly, other data processing device cannot decrypt the encrypted data in the storage device 200 without the identification number of the system 300 and the initial password to generate the decrypting key.

It should be understood that the encrypting key and the decrypting key can also be generated using the initial password and the identification numbers of the data processing device 100 and the system 300, such that the encrypted data stored in the storage device 200 cannot be decrypted by other data processing device even though the initial password and the identification number of the system 300 are obtained.

Figure 2A:
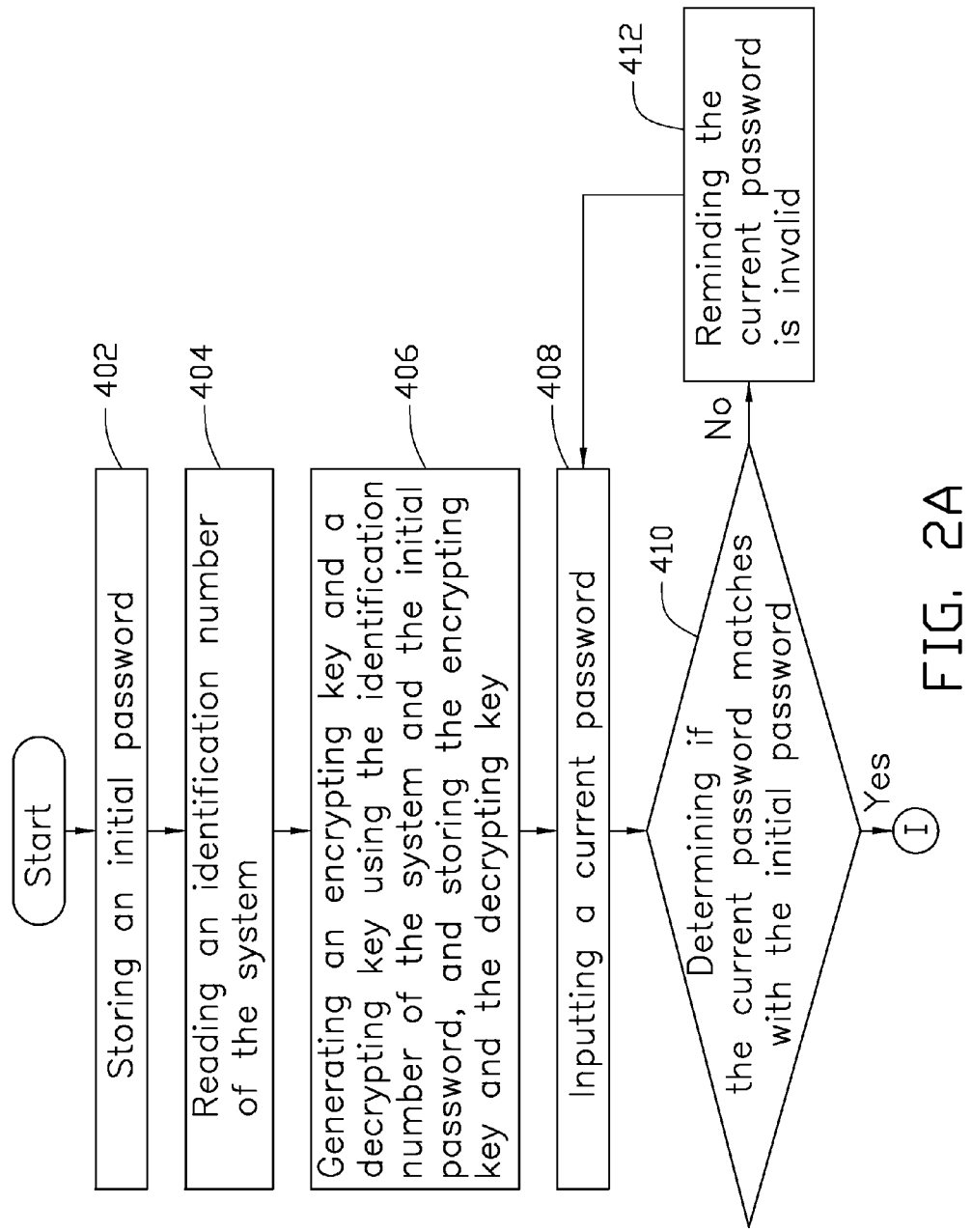
FIGS. 2A and 2B are a flow chart of a method for encrypting and decrypting data.
Figure 2B:
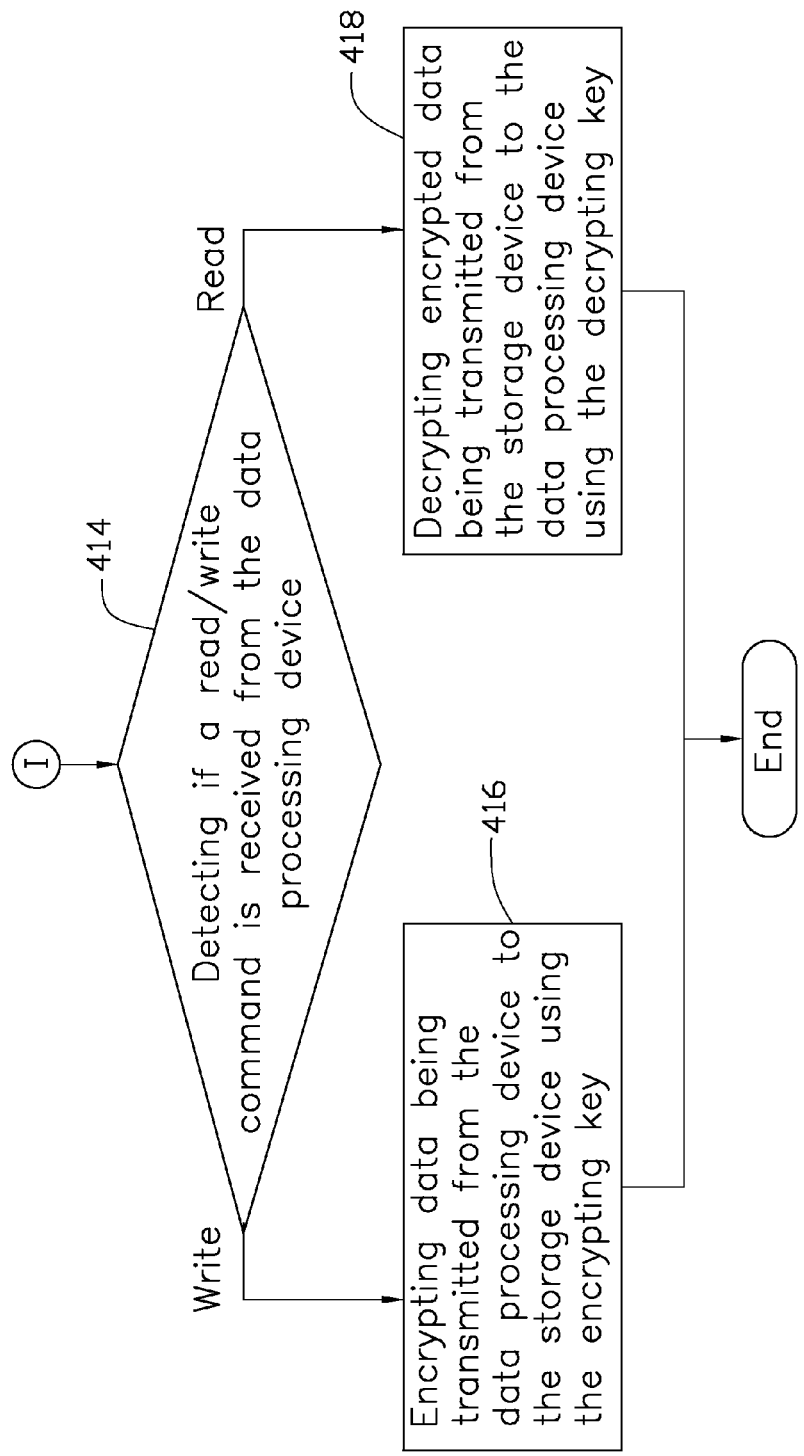

FIGS. 2A and 2B show a flowchart of a method for data encrypting and decrypting, which can be exemplarily performed by the system 300. In this embodiment, the method includes following steps 402-418.

In step 402, an initial password is inputted from the input unit 303 and stored in the password storing unit 301. In detail, the initial password can be inputted when the system 300 is initialized.

In step 404, an identification number of the system 300 is read. In detail, the identification number of the system 300 is stored in the identification storing unit 320 in manufacturing, and is read by the read unit 309.

In step 406, an encrypting key and a corresponding decrypting key are generated using the identification number of the system 300 and the initial password, and then the encrypting key and the decrypting key are stored. In detail, the encrypting key and the decrypting key are generated by the key generator 311 and stored in the key storing unit 313.

In step 408, a current password inputted by a user is received. In detail, the current password is inputted from the input unit 303 in response to operations of the user.

In step 410, the current password is compared with the initial password to determine if the current password matches with the initial password. In detail, the current password is compared with initial password by the authentication unit 305.

In step 412, if the current password is not matched with the initial password, an error message is displayed to remind the user that the current password is invalid. In detail, the error message is generated by the reminding unit 307 and displayed on a display (not shown).

In step 414, if the current password matches with the initial password, the controller 319 keeps detecting if a read/write command is received from the data processing device 100.

In step 416, if a write command is received, data being transmitted from the data processing device 100 to the storage device 200 are encrypted using the encrypting key. In detail, the data are encrypted by the encrypting unit 315.

In step 418, if a read command is received, encrypted data being transmitted from the storage device 200 to the data processing device 100 are decrypted using the decrypting key. In detail, the decrypting unit 317 initially detects that if the data being transmitted from the storage device 200 have been encrypted. If yes, then the decrypting unit 317 decrypts the data using the decrypting key. Otherwise, the data can directly flow through.

It should be mentioned that, in step 404, an identification number of the data processing device 100 can be also read. Accordingly, in step 406, the encrypting key and the decrypting key are generated using the initial password and the identification numbers of the system 300 and the data processing device 100.

It is to be understood, however, that even though numerous characteristics and advantages of the present embodiments have been set forth in the foregoing description, together with details of the structures and functions of the embodiments, the disclosures are illustrative only, and changes may be made in details, especially in matters of arrangement of parts within the principles of the invention to the full extent indicated by the broad general meaning of the terms in which the appended claims are expressed.

What is claimed is:

1. A system for encrypting and decrypting data being transmitted between a data processing device and a storage device, comprising:
    a password storing unit operable to store an initial password;
    an input unit operable to receive a current password in response to operations of a user;
    an authentication unit operable to determine if the current password matches with the initial password;
    a read unit operable to read the initial password and an identification number of the system;
    a key generator operable to generate an encrypting key and a corresponding decrypting key using the initial password and the identification number of the system;
    an encrypting unit operable to encrypt data being transmitted from the data processing device to the storage device using the encrypting key if the current password matches with the initial password; and
    a decrypting unit operable to decrypt data encrypted using the encrypting key and being transmitted from the storage device to the data processing device, using the decrypting key if the password matches with the initial password.

2. The system as claimed in claim 1, wherein the read unit is operable to read an identification number of the data processing device, and the key generator is operable to generate the encrypting key and the decrypting key using the initial password and the identification numbers of the system and the data processing device.

3. The system as claimed in claim 1, further comprising a controller, the authentication unit being operable to output a valid signal if the current password matches with the initial password, the controller being operable to activate the encrypting unit to encrypt data if a write command is received from the data processing device and activate the decrypting unit to decrypt encrypted data if a read command is received from the data processing device, after receiving the confirming signal.

4. The system as claimed in claim 1, further comprising a key storing unit operable to store the encrypting key and the decrypting key.

5. The system as claimed in claim 1, further comprising a reminding unit operable to display that the current password is invalid if the current password is not matched with the initial password.

6. The system as claimed in claim 1, further comprising an identification storing unit operable to store the identification number of the system.

7. The system as claimed in claim 6, wherein the identification storing unit is a one time programmable read-only memory.

8. The system as claimed in claim 1, wherein the password storing unit is a one time programmable read-only memory.

9. A method used in a system for encrypting and decrypting data being transmitted between a data processing device and a storage device, the method comprising:
    storing an initial password;
    reading an identification number of the system;
    generating an encrypting key and a corresponding decrypting key using the identification number of the system and the initial password;
    inputting a current password;
    determining if the current password matches with the initial password;
    detecting if a read/write command is received from the data processing device, if the current password matches with the initial password;
    encrypting data being transmitted from the data processing device to the storage device using the encrypting key if a write command is received; and
    decrypting data encrypted using the encrypting key and being transmitted from the storage device to the data processing device, using the decrypting key if a read command is received.

10. The method as claimed in claim 9, further comprising:
reading an identification number of the data processing device; and
the encrypting key and the decrypting key being generated using the initial password and the identification numbers of the system and the data processing device in the generating step.

11. The method as claimed in claim 9, further comprising:
storing the encrypting key and the decrypting key.

12. The method as claimed in claim 9, further comprising:
reminding that the inputted password is invalid if the current password is not matched with the initial password.

* * * * *